United States Patent [19]

Ullrich et al.

[11] Patent Number: 5,173,251

[45] Date of Patent: Dec. 22, 1992

[54] MIXING APPARATUS FOR FLUIDS

[75] Inventors: Manfred Ullrich, Bergisch Gladbach; Gunter Damm, Köln; Ralf Wehrlein, Bochum, all of Fed. Rep. of Germany

[73] Assignee: Siemens Aktiengesellschaft, Munich, Fed. Rep. of Germany

[21] Appl. No.: 787,042

[22] Filed: Nov. 4, 1991

Related U.S. Application Data

[63] Continuation of PCT/DE90/00315, May 2, 1990

[30] Foreign Application Priority Data

May 3, 1989 [WO] PCT Int'l Appl. .. PCT/EP89/00486

[51] Int. Cl.$^5$ ............................................. G21C 1/00
[52] U.S. Cl. .................................. 376/389; 376/381
[58] Field of Search ............... 376/385, 388, 389, 381, 376/380

[56] References Cited

U.S. PATENT DOCUMENTS 4,257,845 3/1981 Lukaszewicz et al. ............. 376/381
4,302,293 11/1981 Elter et al. .......................... 376/381

FOREIGN PATENT DOCUMENTS

| | | |
|---|---|---|
| 2425959 | 4/1982 | Fed. Rep. of Germany . |
| 2506293 | 1/1983 | Fed. Rep. of Germany . |
| 2818029 | 1/1984 | Fed. Rep. of Germany . |
| 2950774 | 7/1984 | Fed. Rep. of Germany . |
| 2742847 | 7/1985 | Fed. Rep. of Germany . |
| 3110173 | 8/1985 | Fed. Rep. of Germany . |
| 2709171 | 1/1987 | Fed. Rep. of Germany . |
| 3532413 | 3/1987 | Fed. Rep. of Germany . |
| 3517655 | 7/1987 | Fed. Rep. of Germany . |
| 3707379 | 9/1988 | Fed. Rep. of Germany . |
| 2382264 | 9/1978 | France . |
| 1183355 | 3/1970 | United Kingdom . |
| 1520482 | 8/1978 | United Kingdom . |
| 2086749 | 5/1982 | United Kingdom . |
| 8806493 | 9/1988 | World Int. Prop. O. . |

Primary Examiner—Donald P. Walsh
Assistant Examiner—Frederick H. Voss
Attorney, Agent, or Firm—Herbert L. Lerner; Laurence A. Greenberg

[57] ABSTRACT

A mixing apparatus for a plurality of turbulently flowing fluid flows varying in temperature and/or composition includes a mixing chamber having a non-circular or predetermined cross section and a straight or curved center line. A plurality of single-conduit and parallel or radial deflector elements are disposed beside the mixing chamber and staggered in the direction of the center line. The deflector elements receive a fluid flow being oriented at an angle relative to the center line and staggered laterally. The deflector elements deflect the fluid flow tangentially into the mixing chamber. The mixing chamber has an outlet opening for the exit of a mixed fluid flow. In a gas-cooled, high-temperature nuclear reactor with a circular outline, the mixing apparatus has a horizontal, annular mixing chamber with a plurality of sectors. Horizontal annular conduits receive at least one fluid flow. A plurality of vertical conduits are disposed above the sectors and have upper ends connected to the horizontal annular conduits and lower ends connected to the mixing chamber. An outlet opening communicates with the mixing chamber. The sectors havie a plurality of bores formed therein in the vicinity of the outlet opening for receiving absorber material.

9 Claims, 4 Drawing Sheets

MIXING APPARATUS FOR FLUIDS

CROSS-REFERENCE TO RELATED APPLICATION

This application is a Continuation of International application PCT/DE90/00315, filed May 2, 1990.

The present invention relates to a mixing apparatus for a plurality of turbulently flowing fluid flows of varying temperature and/or composition, having a mixing chamber with a predetermined cross section, a straight or a curved center line and an outlet opening for the exit of a mixed fluid flow.

Such a mixing apparatus is of particular importance for large throughput quantities at low pressure loss, for instance with a straight center line for heating or air conditioning systems, or with a circular center line for a gas-cooled high-temperature nuclear reactor through which helium flows from top to bottom. In such high-temperature nuclear reactors, in which the core container is made up of graphite blocks and the mean gas exit temperature is approximately 950° C., the local maximum-possible gas temperatures must not be more than slightly above the mean value, because the temperature resistance of the metal components connected to it is limited to approximately 1000° C. Moreover, changing temperatures put added stress on structural parts, yet for the sake of the service life of the parts the stress should be as slight as possible. An attempt is therefore made to operate such reactors with local temperature differences that are as slight as possible over time.

British Patent No. 1,183,355 describes an apparatus for mass and heat transfer between solid or liquid particles and gases that has a rotationally symmetrical vortex chamber. The chamber has a plurality of inlet conduits that are staggered in the longitudinal direction of a swirl chamber, and because of their tangential inflow, they induce a rotary flow with freely floating rotating rings of particles in the swirl chamber. The gas, having been cleaned of particles, leaves the swirl chamber through an outlet. The particles themselves are carried away through a different outlet. It is not the object of such an apparatus to mix a plurality of fluid flows.

German Patent DE 25 06 293 C2 describes a gas-cooled high-temperature nuclear reactor in which direct neutron irradiation from the hot-gas collecting chamber into the hot-gas lines and an attendant activation of the metal fixtures in such lines are prevented. That is attained by providing a neutron shield, which is in the form of an annular wall in the hot gas collecting chamber and which extends over its entire height. The shield is coaxial with the reactor cavern and spaced apart from it by a distance, in such a way that the resultant annular chamber is dimensioned adequately for the coolant gas flow, and the annular wall has a plurality of rows of slits for the passage of the coolant gas, with the slits being offset from the coolant gas outlet connection pieces. Another advantage of such a configuration is considered to be that forced guidance of the hot cooling gas, which improves the temperature distribution at the coolant gas outlet connection pieces, is attained by the way in which the annular wall and the predominantly radially extending slits are disposed.

German Patent DE 27 42 847 C2, which also relates to a gas-cooled high-temperature nuclear reactor, achieves improved mixing of the hot coolant gas prior to its entry into the hot-gas conduits by means of high columns that have radial bores, which are disposed in a plurality of planes distributed over the entire length of the columns and through which the interior of the columns communicates with the hot-gas collecting chamber. Since the hot gas can flow out uniformly in all of the planes of the hot-gas collecting chamber, the development of laminations in the flow is avoided, and good mixing of the hot gas arriving from the various core regions is attained. An annular chamber with the structure described in the previous paragraph is not employed.

German Published, Non-Prosecuted Patent Application DE 37 07 379 A1, which is again applicable for a gas-cooled high-temperature nuclear reactor, prevents the creation of hot-gas streams of varying temperature in a hot-gas collecting chamber by means of two vertical baffle walls protruding into the hot-gas collecting chamber. Once again, an annular chamber with numerous slits is not provided.

In the sense of the present invention, "turbulent" describes fluid flows that definitely do not flow laminarly, or in other words have a Reynolds number of more than 5000, with respect to the hydraulic diameter of the mixing chamber. The Reynolds number Re is dimensionless and in fluids, it represents the ratio between the forces of inertia and the forces of viscosity. The hydraulic diameter of an arbitrary cross section equals the diameter of a circle of the same area.

The "center line" in the sense of the present invention is defined as a line that joins the various centroids of the mixing chamber cross sections. It may be straight or curved. The "cross-sectional plane" of the mixing chamber is defined as a plane that is penetrated perpendicularly by the center line. A flow is defined as "tangential" if it enters the vortex produced in the mixing chamber at the circumference of the vortex, in the direction of rotation of the vortex. "Radial" is intended to pertain only to the curved center line.

It is accordingly an object of the invention to provide a mixing apparatus for a plurality of turbulently flowing fluid flows of varying temperature and/or composition, having a mixing chamber of predefined cross section with a straight or curved center line and having an outlet opening for the exit of a mixed fluid flow, which overcomes the hereinafore-mentioned disadvantages of the heretofore-known devices of this general type.

A special object of this invention is to disclose a mixing apparatus for a gas-cooled high-temperature nuclear reactor with a radially and/or azimuthally different release of heat in the core. Hot and cold gas streams in the ensuing outflow line, which leads to one or more heat exchangers, should be avoided as a result. Gas streams that emerge from unavoidable gaps between graphite blocks in a high-temperature nuclear reactor or which are needed to cool reflector rods or a packed bed of the fuel assembly in a pebble discharge tube, should be intimately mixed with the primary gas flow so that the structural parts through which there is a subsequent flow are not threatened.

With the foregoing and other objects in view, in order to attain the first object given above, there is provided, in accordance with the invention, a mixing apparatus for a plurality of turbulently flowing fluid flows varying in temperature and/or composition, comprising a mixing chamber having a non-circular or non-round cross section and a straight center line, a plurality of single-conduit and parallel deflector elements being disposed beside the mixing chamber and staggered in the direction of the center line, each of the deflector elements having means for receiving a fluid flow being oriented at an angle relative to the center line and staggered laterally and means for deflecting or diverting the fluid flow tangentially into the mixing chamber, and the mixing chamber having an outlet opening for exiting of a mixed fluid flow.

With the objects of the invention in view, in order to attain the first object given above, there is also provided a mixing apparatus for a plurality of turbulently flowing fluid flows varying in temperature and/or composition, comprising a mixing chamber having a predetermined cross section and a curved center line, a plurality of single-conduit and radial deflector elements being disposed beside the mixing chamber and staggered in the direction of the center line, the deflector elements having means for receiving one or a plurality of fluid flows being oriented at an angle relative to the center line and staggered laterally and means for deflecting or diverting the at least one fluid flow tangentially into the mixing chamber, and the mixing chamber having an outlet opening for exiting of a mixed fluid flow.

With these configurations, a macroscopic vortex of predetermined rotary direction is created in the mixing chamber. The vortex moves helically to the outlet opening, and in so doing assures good mixing of the fluid flows entering from the following deflection elements and is kept in rotation by the kinetic energy of the fluid flows arriving in staggered fashion in the direction of the center line. As a result of the deflection beside the mixing chamber, or in other words immediately before the entry into the mixing chamber, the fluid flows are preferentially oriented in the desired direction at a tangent with respect to the vortex. The deflector elements preferably have a rectangular conduit cross section.

In accordance with another feature of the invention, the deflector elements have a curved wall in a cross-sectional plane of the mixing chamber. The wall of the deflector elements that is curved in the cross-sectional plane of the mixing chamber, preferably curved circularly, also serves to provide the desired tangential inflow and reduces the pressure loss in the deflection element, in comparison with a rectangular deflection.

In accordance with a further feature of the invention, the mixing chamber has a given full height, and the mixing chamber is joined over the given full height to the deflector elements. If the mixing chamber is joined to the deflector elements at its full height, the pressure loss is likewise reduced, and if the wall is curved, the tangential inflow is promoted.

In accordance with an added feature of the invention, the mixing chamber is horizontally oriented and has a top, and the deflector elements have vertical limitations penetrating part of the mixing chamber at the top. In accordance with an additional feature of the invention, the mixing chamber is horizontally oriented and has a cover with outer vertical openings partly penetrating the cover above the mixing chamber. Piercing of some deflector elements and part of the mixing chamber even prior to the deflection also promotes the creation and maintenance of the desired macroscopic vortex. However, this piercing should be present only in the peripheral region of the mixing chamber, so that the fluid flows there will also enter the vortex approximately at a tangent.

In accordance with yet another feature of the invention, the mixing chamber has a rectangular cross section. The rectangular cross section of the mixing chamber according to the invention is important not only because it makes it easier to manufacture a large mixing apparatus, but also because there are considerable advantages for mixing of the fluid flows as well. In a conventional circular mixing chamber of the prior art, individual gas streams could propagate in a helical pattern without hindrance. However, in a mixing chamber with a rectangular cross section and a tangential inflow, the rotating vortex in its corners is constantly disturbed and braked, but is supplied with kinetic energy and kept in rotation by the fluid flows entering in staggered fashion. Other cross-sectional shapes, such as polygonal, rounded or oval ones, are also possible in principle. However, a circular cross-section undergoes less turbulence.

In accordance with yet a further feature of the invention, the center line is curved and there is provided a distributor having the shape of a star or part of a star for distributing the fluid flows to a plurality of the radial deflector elements. A mixing apparatus with a circular or partially circular center line and with a distributor in the form of a star or part of a star, for distributing the fluid flows, which arrive in joined fashion at a ring or partial ring or circle or partial circle, to radial deflector elements, is advantageous as compared with a straight mixing chamber, because in this case the mixing apparatus can be made with a relatively small requisite amount of base area.

In accordance with yet an added feature of the invention, the center line is curved and the deflector elements are widened in the radial direction toward the outside. Widening the deflector elements radially toward the outside takes into account the fact that the throughput of the fluid flows that arrive from a circular area, or the area of part of a circle, increases from the inside outward.

The special object of the invention may also be attained for a gas-cooled nuclear reactor having a horizontal, annular mixing chamber beneath its core, which has radially disposed sectors and a radial outlet opening. The core of a high-temperature nuclear reactor is preferably constructed of spherical (pebble-type) or block-shaped fuel assemblies. In either case it is surrounded by a container that is formed of stacked graphite blocks in the vicinity of the core, which farther outward are insulated with coal stone, cooled, and held together by a steel container. If the core of the reactor is formed of pebble-type fuel assemblies, then the core container has a funnel-shaped bottom that is penetrated by numerous vertical gas conduits and ends in a circular pebble discharge conduit. The container and the bottom are formed of stacked graphite blocks, which necessarily have gaps between them, or else such gaps are even quite intentionally provided, for instance in order to cool the fuel assemblies located in the pebble discharge conduit or to cool absorber rods located in the blocks of the container.

With the objects of the invention in view, in order to attain the special object of this invention for a gas-cooled high-temperature nuclear reactor, there is furthermore provided, in a gas-cooled, high-temperature nuclear reactor with a circular outline, a mixing apparatus for a plurality of turbulently flowing fluid flows varying in temperature and/or composition, comprising a horizontal, annular mixing chamber having a plurality of sectors, horizontal annular conduits for receiving at least one fluid flow, a plurality of vertical conduits being disposed above some of the sectors and having upper ends connected to the horizontal annular conduits and lower ends connected to the mixing chamber, an outlet opening communicating with the mixing chamber, and some of the sectors having no radial deflector elements but instead a plurality of bores formed therein in the vicinity of the outlet opening for receiving absorber material.

In order to make it possible to provide approximately uniform shielding over its periphery against radioactive radiation outside the reactor, it is desirable to replace the shielding that is missing in the vicinity of the outlet opening with a very effective absorber material, such as boron carbide, in the adjacent graphite blocks. It is also logical for reasons having to do with mixing technology to leave out some of the radial deflector elements in the graphite blocks in the region of the outlet opening, so that hot or cold gas streams cannot reach the outflow line from there without having been adequately mixed. In order to enable the gas flows arriving in the region of the missing deflector elements to find some way to the outflow line, the vertical conduits present above the deflector elements are joined at their upper ends with the horizontal annular conduits, through which these gas flows can flow to other deflector elements.

In accordance with another feature of the invention, one sector forms a plurality of deflector elements. In other words, for instance, two radial guide walls are each formed by a single sector-shaped graphite block between the radial deflector elements. This embodiment creates structural parts that can still be manufactured and transported because of their size, and that with a useful ratio of height to width can also be stacked one above the other without tipping over. With the blocks disposed below or above them, these blocks form mutually independent columns with gaps between them, for hindering differential expansions of adjacent columns in the vertical direction.

In accordance with a further feature of the invention, in a gas-cooled high-temperature nuclear reactor on the pebble-bed principle with a central pebble discharge conduit, it is provided that the pebble discharge conduit is constructed by the sectors, i.e., the stacked graphite blocks. This avoids a separate self-contained pebble discharge tube. Due to the pressure differences prevailing during operation of such a reactor, the gaps present between the blocks assure a constant gas flow, which adequately cools the fuel assembly pebbles located in the pebble discharge conduit. Due to the ensuing good mixing according to the present invention, these gas flows are tolerable.

In accordance with a concomitant feature of the invention, the graphite blocks have vertical bores for receiving absorber material in the vicinity of the pebble discharge conduit, so that there will be less power production in the highly radioactive fuel assemblies in the pebble discharge conduit.

Other features which are considered as characteristic for the invention are set forth in the appended claims.

Although the invention is illustrated and described herein as embodied in a mixing apparatus for fluids, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
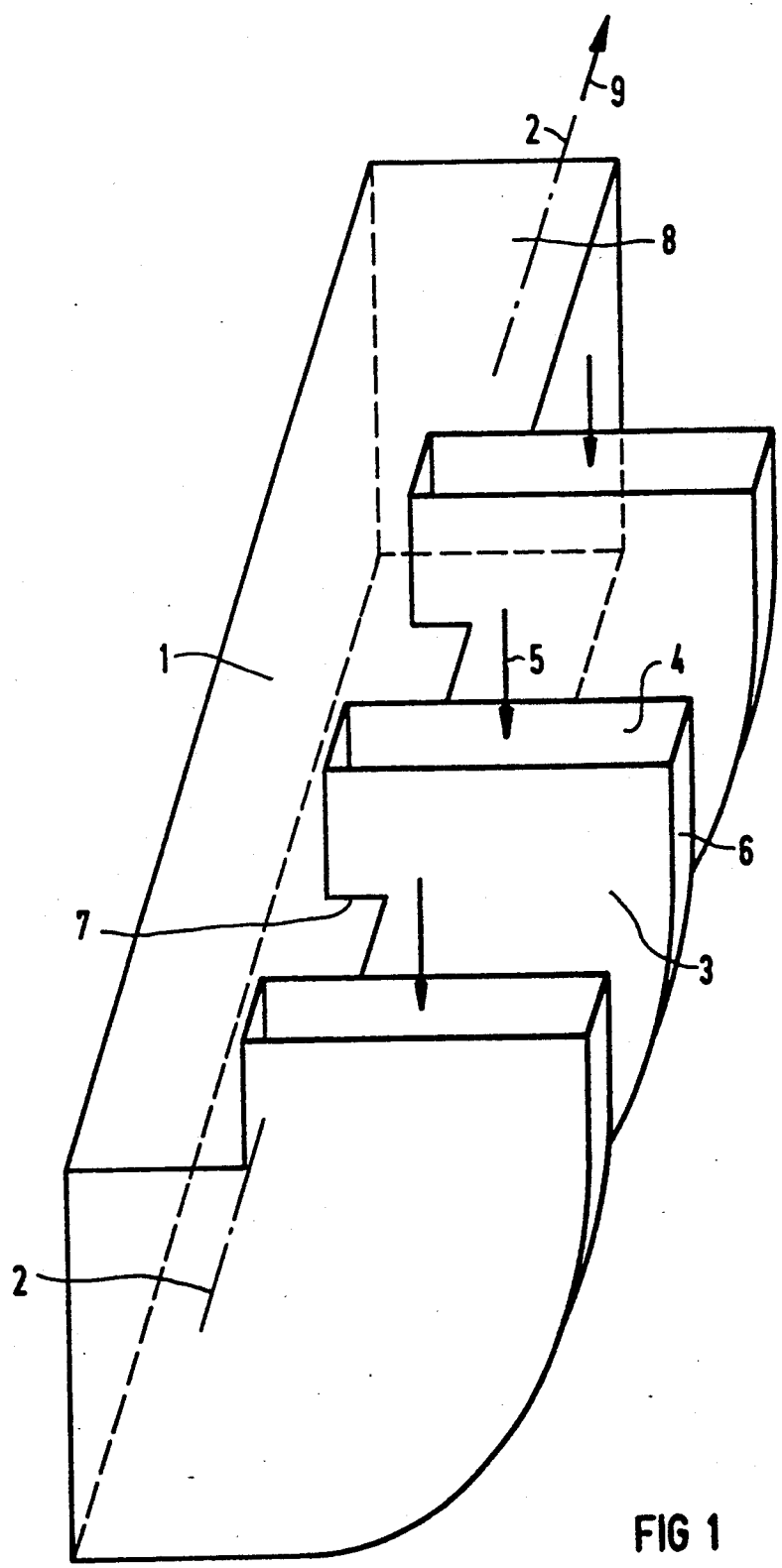
FIG. 1 is a diagrammatic perspective view of a mixing apparatus with a straight center line and with three deflector elements serving as an inlet for fluid flows.

Referring now to the figures of the drawings in detail and first, particularly to FIG. 1 thereof, there is seen a mixing chamber 1 that is closed on the lower end of the drawing and open on the upper end and which has a rectangular cross section and a straight center line 2. Deflector elements 3 which are connected to the right-hand side of the mixing chamber 1, over the entire height of the mixing chamber, deflect fluid flows 5 entering vertically from above through rectangular openings 4. The flows 5 also have intrinsically different temperatures and/or compositions. Deflector walls 6 that in this case are in the shape of a quarter circle deflect the fluid flows 5 into the mixing chamber 1, and in so doing carry a predominant portion of the fluid flows 5 at undiminished speed into the lower part of the mixing chamber 1. In this way, a macroscopic vortex is generated in the mixing chamber 1 without any special baffle devices. Although this vortex is continuously braked in the corners of the rectangular cross section of the mixing chamber 1, it is kept in rotation by an inflow from a plurality of the deflector elements 3 that are disposed in staggered fashion in the longitudinal direction of the mixing chamber. The inflow is at a tangent with respect to the vortex. The openings in the vertical parts of the deflector elements 3 at a location 7 on the mixing chamber 1 carry fluid flows into the mixing chamber 1 at a tangent to the vortex. This can be seen more clearly in FIG. 2. In order to provide good, thorough mixing, the mixing chamber 1 should be substantially longer at the upper end of FIG. 1 than shown. The end of he mixing chamber 1 has a rectangular outlet opening 8 for the exit of a mixed fluid flow 9.

Figure 2:
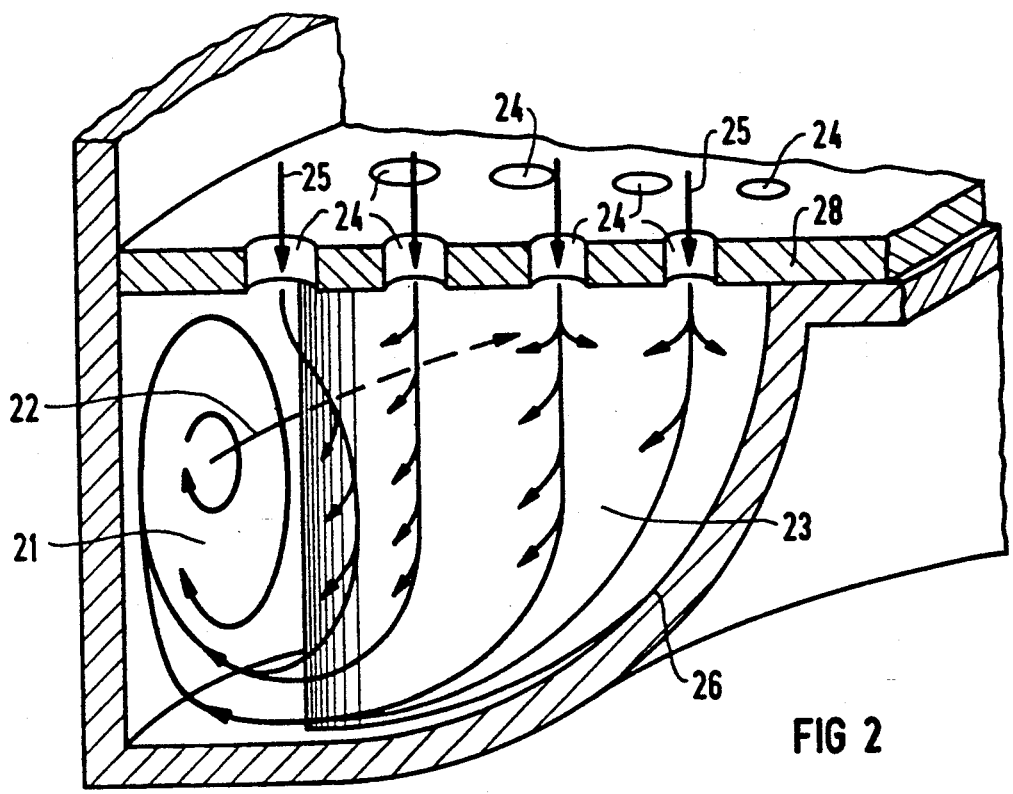
FIG. 2 is a fragmentary, vertical radial-sectional view, expanded for perspective, through a mixing apparatus with a circularly curved center line.

In FIG. 2, a mixing chamber 21 has a curved center line 22 and is joined over its entire height to one of a plurality of deflector elements 23. Fluid flows 25 flow through vertical openings 24 in a cover or ceiling 28 and are deflected jointly by walls 26, which are curved into a quarter circle, and carried preferentially into the lower part of the mixing chamber 21. There, as already described with regard to FIG. 1, a macroscopic vortex is created, which in this case, in accordance with the curved center line 22, moves to a non-illustrated outlet opening.

Figure 3:
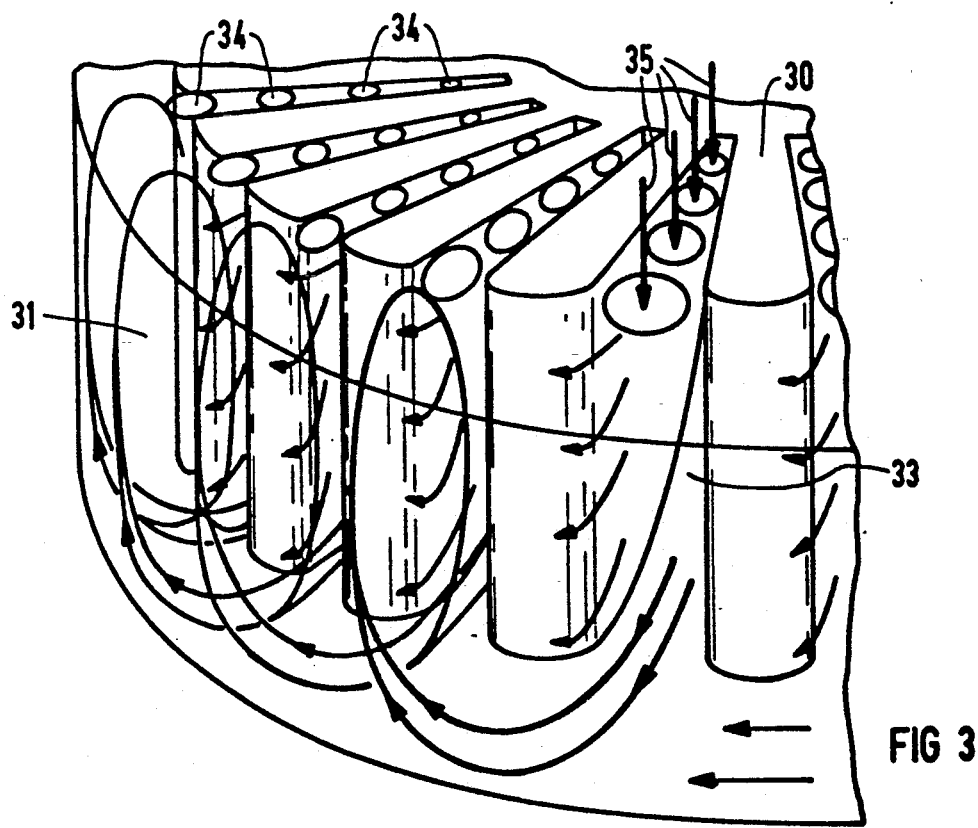
FIG. 3 is a fragmentary perspective view of one part of a circular mixing apparatus.

FIG. 3 shows a mixing apparatus as in FIG. 2, but by not showing the cover or ceiling and outer wall of a mixing chamber 31, a part of a star-shaped distributor 30 is made visible, which carries fluid flows 35, entering through diagrammatically shown openings 34, into the mixing chamber 31 through radial deflector elements 33. Once again, as already described for FIGS. 1 and 2, a macroscopic vortex in the mixing chamber 31 is created, which is kept in rotation by the inflows, that are predominantly at a tangent, from the deflector elements 33, which in this case are staggered in the circumferential direction of the mixing chamber 31. An outlet for the exit of the mixed fluid flow is also not shown in this case. However, as in FIGS. 4 and 5 which are described below, the outlet may be provided radially toward the outside of the mixing chamber.

Figure 4:
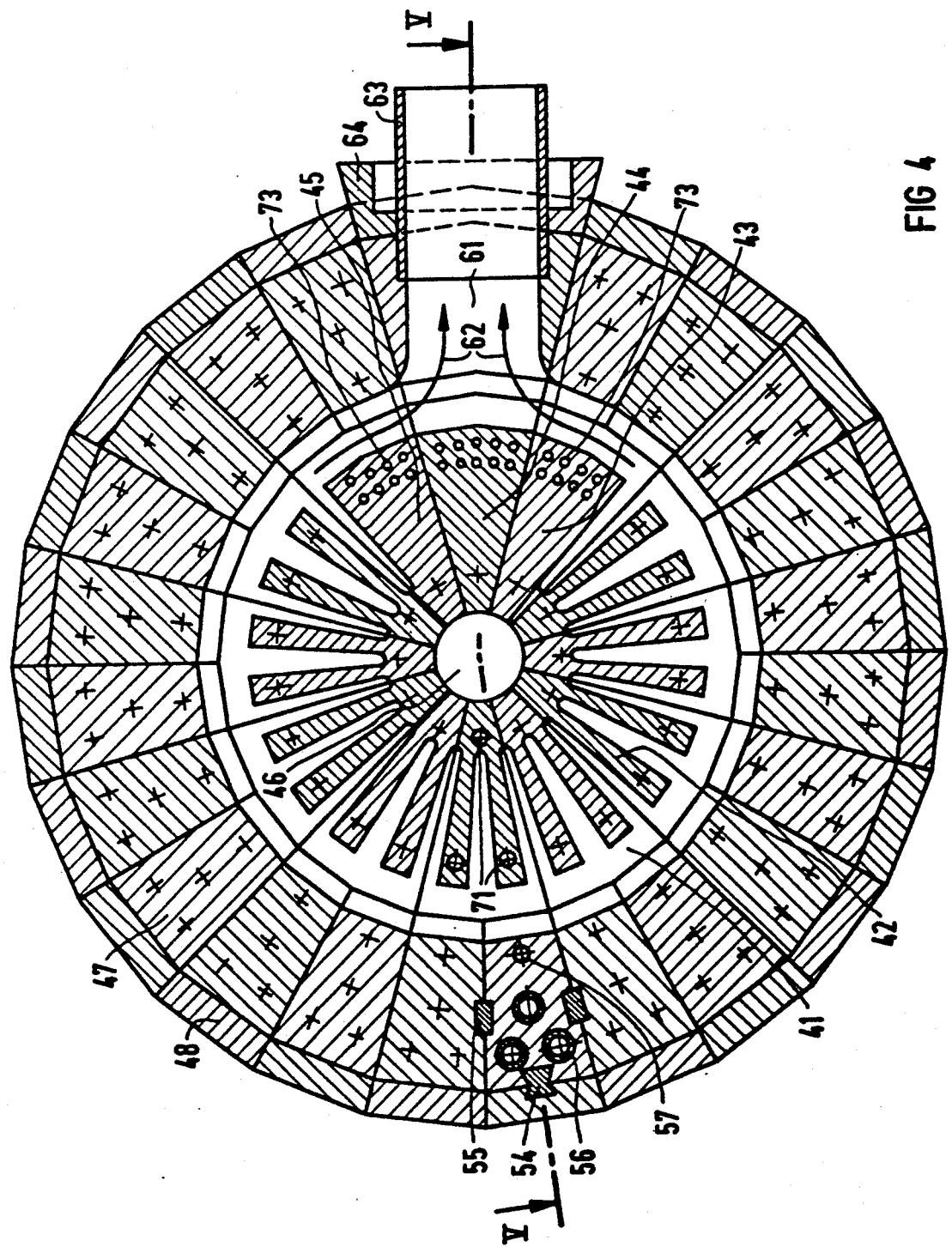
FIG. 4 is a horizontal-sectional view of a mixing apparatus underneath a core of a gas-cooled high-temperature nuclear reactor according to the pebble-bed principle.
Figure 5:
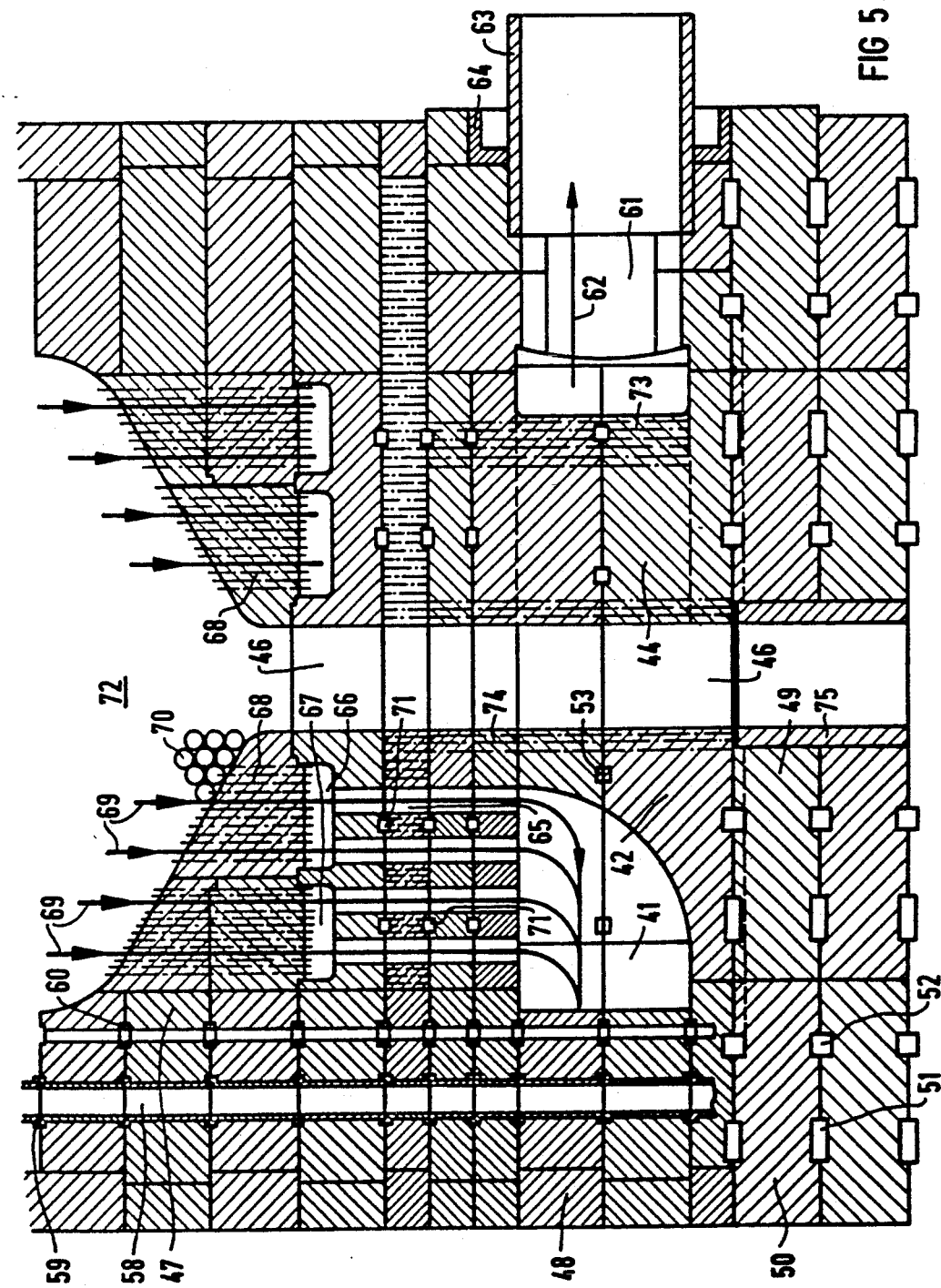
FIG. 5 is a vertical-sectional view of the mixing apparatus taken along the line V—V of FIG. 4, in the direction of the arrows.

FIGS. 4 and 5 show an application of the present invention in the form of a mixing apparatus for a gas-cooled nuclear reactor operating on the pebble-bed principle. In both drawing figures, the same numerals are used. A circular mixing chamber 41 with a rectangular cross section surrounds a distributor being formed of twelve sectors 42–45. There are nine identical sectors 42 and three sectors 43, 44 and 45 without deflector elements. These twelve sectors form a pebble discharge conduit 46 in the middle. Toward the outside, the mixing chamber 41 is defined by twenty-two sector-shaped graphite blocks 47, which are insulated on the outside by coal stone blocks 48. Along with the sectors 42, 43, 44 and 45 and an outlet opening 61, the blocks 48 rest on twenty-four likewise sector-shaped graphite blocks 49 and 50 and are joined both to the blocks 49 and 50 and to one another by various smaller graphite blocks 51, 52, 53, 54, 55. Moreover, some of the graphite blocks 47 are pierced by vertical bores 56 and 57, which are used for cooling and/or for receiving absorber rods and absorber pebbles. The bores contain graphite liners 58 and sealing rings 59 and 60, but this is not of any importance to the present invention. As is seen in the right-hand half of each of FIGS. 4 and 5, the mixing chamber 41 discharges in the outlet opening 61 for an exiting mixed fluid flow 62. In this region, the sector-shaped graphite blocks 47 and coal stone blocks 48 are respectively pierced by an outlet connecting piece 63 and a ring 64. There are numerous vertical conduits 65 above the mixing chamber 41 and deflector sectors 42, but not in the vicinity of the outlet opening 61. Farther up, these conduits 65 communicate with two annular chambers 66 and 67, so that gas flows 69 arriving through numerous openings 68 across the reactor cross section can find a way to the mixing chamber 41 through the conduits 65. Pebble-type fuel assemblies 70 are shown at only one point in FIG. 5, but in actuality a great many of them form a core 72, which is substantially contained by the graphite blocks 47. The fuel assemblies 70 also fill the pebble discharge tube 46 and are discharged downward as needed, in a non-illustrated manner. The gas flows 69 flow from top to bottom, first through the numerous small openings 68, into the two concentric annular chambers 66 and 67. From there, the gas flows 69 flow through the numerous vertical conduits 65, but these are disposed only above the deflector sectors 42 where, as already described for the preceding drawing figures, they are deflected into the mixing chamber 41. The rotating vortex created in the mixing chamber flows clockwise in the upper half of FIG. 4 and counter-clockwise in the lower half of FIG. 4 and emerges as the mixed gas flow 62 through the outlet opening 61 and the outlet connecting piece 63, into a line, which will not be described in detail, to a non-illustrated heat exchanger. The intended disposition of sectors 43, 44, 45 without deflection elements in the vicinity of the outlet opening 61 prevents any inadequately mixed gas flows from reaching the outside. Radioactive radiation emerging in particular from the highly radioactive fuel assemblies 70 in the pebble discharge conduit 46, which cannot be shielded with graphite blocks in the vicinity of the discharge conduit 61, is reduced in this region with absorber material with which bores 73 can be filled. As is shown in FIG. 5 only, bores 74 are also disposed in the immediate vicinity of the pebble discharge conduit 46 and can be filled with absorber material in order to already reduce the radioactive radiation at that point. This is of particular significance at the level of the deflector sectors 42, which do allow more radioactive radiation to reach the outside because the graphite material is absent there. Inside the graphite blocks 49, the pebble discharge conduit 46 is extended downward with a pebble discharge tube 75.

We claim:

1. In a gas-cooled, high-temperature nuclear reactor with a circular outline, a mixing apparatus for a plurality of turbulently flowing fluid flows varying in at least one of temperature and composition, comprising a horizontal, annular mixing chamber having a plurality of sectors, horizontal annular conduits for receiving at least one fluid flow, a plurality of vertical conduits being disposed above said sectors and having upper ends connected to said horizontal annular conduits and lower ends connected to said mixing chamber, an outlet opening communicating with said mixing chamber, said sectors having a plurality of bores formed therein in the vicinity of said outlet opening for receiving absorber material, and one of said sectors forming a plurality of deflector elements for deflecting the at least one fluid flow into said mixing chamber.

2. The mixing apparatus according to claim 1, including an at least partly star-shaped distributor distributing the fluid flows to a plurality of said radial deflector elements.

3. The mixing apparatus according to claim 1, wherein said deflector elements are widened in radial direction toward the outside.

4. The mixing apparatus according to claim 1, including a plurality of single-conduit and radial deflector elements disposed beside said mixing chamber.

5. The mixing apparatus according to claim 1, wherein said deflector elements have a curved wall in a cross-sectional plane of said mixing chamber.

6. The mixing apparatus according to claim 5, wherein said mixing chamber has a given full height, and said mixing chamber is joined over said given full height to said the deflector elements.

7. The mixing apparatus according to claim 5, wherein said mixing chamber is horizontally oriented and has a cover with outer vertical openings partly penetrating said cover above said mixing chamber.

8. The mixing apparatus according to claim 1, wherein the high-temperature nuclear reactor operates on the pebble bed principle, and said sectors form a central pebble discharge conduit.

9. The mixing apparatus according to claim 8, wherein said sectors have vertical bores formed therein in the vicinity of said pebble discharge conduit for receiving absorber material.

* * * * *